Patented Mar. 20, 1945

2,372,108

UNITED STATES PATENT OFFICE 2,372,108

THIXOTROPIC ACRYLATE EMULSIONS

Harry T. Neher, Bristol, and William R. Conn, Melrose Park, Pa,. assignors to Röhm & Haas Company, Philadelphia, Pa., a corporation of Delaware No Drawing. Application February 25, 1942,
Serial No. 432,270

7 Claims. (Cl. 260—32)

This invention relates to viscous, thixotropic emulsions of methyl and ethyl esters of acrylic and methacrylic acids and co-polymers thereof and to a method for their preparation.

In the usual procedure for the preparation of polymeric acrylate and methacrylate dispersions in water the monomer is emulsified in water containing emulsifying agent. In one procedure this emulsion is polymerized directly by heating. Alternatively a portion of the emulsion of monomer may be placed in a reaction vessel and heated until the monomer therein has polymerized. The rest of the emulsion of the monomer is then added at such a rate that the polymerization reaction is not interrupted by cooling. In such prior practices it is immaterial whether an emulsifying agent of the anion-active or cation-active type be used. The stable emulsions or dispersions prepared from polymers of lower acrylic esters by the prior techniques are milky and non-viscous. Yet, for certain applications, such as those where coating of fibrous materials without excessive penetration is desired, there is need of thick dispersions.

It is an object of this invention to prepare and provide viscous, thixotropic, aqueous dispersions of polymeric ethyl and methyl esters of acrylic and methacrylic acids and co-polymers thereof.

In accomplishing the objects of this invention a monomeric liquid of the class consisting of methyl and ethyl esters of acrylic and methacrylic acids and mixtures thereof is emulsified in an aqueous solution of a cation-active emulsifying agent; an aqueous solution containing a cation-active emulsifying agent, in an amount of at least 5% of the total emulsifying agent used for the final dispersion, is heated to polymerizing temperatures and stirred; and the emulsion of monomeric material is added and mixed therewith in the presence of a polymerizing catalyst at such a rate that polymerizing temperatures are maintained. The dispersion which results is viscous and thixotropic. It possesses a peculiar translucency.

As a cation-active emulsifying agent, there may be used a quaternary ammonium salt or an amine salt, having a substituent of sufficient size to impart capillary activity. Typical useful cation-active agents include such quaternary salts as octadecyl trimethyl ammonium bromide, octadecyl dimethyl benzyl ammonium chloride, cetyl dimethyl ethyl ammonium ethyl sulfate, dodecyl diethyl benzyl ammonium chloride, octadecyloxymethyl dimethyl benzyl ammonium chloride, etc., and salts of such amines as dodecylamine, cetylamine, octadecylamine, octadecylmethylamine, octadecyl dimethylamine, dodecyl diethylamine, cetylamylamine, tert-amylphenoxyethyl dimethylamine, etc. and inorganic or organic acids, such as formic, acetic, propionic, capric, oleic, sulfuric, hydrochloric, etc. The amine salts of organic acids are particularly desirable emulsifying agents when the emulsion formed therefrom is to be used on textile fibers which may be tendered by strong mineral acids. One or more cation-active emulsifying agents may be used in emulsifying the monomer and in the heated solution.

As a polymerizing agent, there may be used an organic peroxide, such as benzoyl peroxide, or hydrogen peroxide, barium peroxide, or the like, or a per-salt or acid, such as ammonium persulfate, peracetic acid, etc. The amount of catalyst required is generally not more than 1% of the monomeric material. The polymerizing catalyst may be added either to the solution of cation-active emulsifier or to the emulsion of monomer.

For the preparation of the viscous thixotropic dispersions of this invention there are separately prepared an emulsion of the acrylic monomer made with a cation-active emulsifier and a solution of a cation-active emulsifying agent. The total amount of emulsifying agent in the emulsion and in the solution must be sufficient to produce a stable dispersion of the polymeric acrylate as a final product. The minimum amount to accomplish this result may be readily determined by a few trials. In general, emulsifying agent in an amount of 1% to 3% of the weight of the monomer as a minimum will accomplish the desired result, but more may be used, particularly when the dispersions are to be dilute under which conditions amounts up to 20% or more of the monomer may be used. The emulsifying agent is divided between the emulsion of monomer and the solution of said agent which is heated. The latter must contain at least 5% of the total amount of the emulsifying agent of the final system in order to ensure thick polymeric dispersions. Larger proportions of emulsifying agent may, if desired, be dissolved in the heated solution, the only limitation being that sufficient emulsifying agent must be used in conjunction with the emulsion of monomer to impart to the monomeric emulsion the degree of stability needed to overcome any tendency toward coalescence during the time the emulsion of monomer is being added to the heated solution.

This invention is illustrated by the following examples, in which the parts indicated are by weight.

Example 1

A portion of 6 parts of cetyldimethylamine was treated with 2 parts of glacial acetic acid and taken up with 24 parts of water to yield a concentrated preparation of emulsifying agent. Two parts of this preparation were transferred to 118 parts of water in a reaction vessel equipped with stirrer and reflux condenser and heated. The rest of the preparation of amine salt was taken up in 217 parts of water and 6 parts of 30% hydrogen peroxide added thereto. This solution was then mixed with 180 parts of ethyl acrylate to yield an emulsion. When the solution of amine salt had been heated to about 100° C., the ethyl acrylate emulsion was gradually added thereto. A thick, viscous emulsion resulted, containing polymerized ethyl acrylate.

Example 2

A mixture of 6 parts of octadecyl dimethylamine, 5 parts of glacial acetic acid, and 24 parts of water was heated to about 55° C. for a few minutes and this emulsifying agent divided, about 10% of it being taken up in 120 parts of water to be used for the heated solution, and the remainder being taken up in 220 parts of water to be used for emulsifying monomeric ethyl acrylate. To the latter were added 6 parts of 30% hydrogen peroxide and 180 parts of ethyl acrylate and an emulsion formed by stirring. The solution meanwhile was heated to 90–100° C. and the emulsion of monomer added thereto with stirring. A thick, viscous, but thixotropic emulsion resulted, containing polymerized ester.

Example 3

The procedure of Example 2 was repeated, but with a change in the proportion of emulsifying agent used in the solution and emulsion of ethyl acrylate. In this case 20% of the emulsifying agent was used in the solution. The polymeric dispersion was somewhat more viscous than in the preceding example.

Example 4

An emulsifying agent was prepared by taking up 10 parts of an amine, prepared from long-chain alcohols derived from mixed fatty acid esters, with 4 parts of acetic acid and 30 parts of water. About one-fifth of this preparation was put into 175 parts of water and the resulting solution heated. The remaining four-fifths was taken up in 300 parts of water to which 10 parts of hydrogen peroxide was added followed by 270 parts of methyl methacrylate, which was emulsified by stirring. This emulsion was slowly run into the stirred hot solution to yield a thick emulsion.

Example 5

The procedure of Example 4 was repeated with substitution of 40 parts of a 25% paste of cetyl dimethyl benzyl ammonium chloride for the amine acetate. There was likewise obtained a viscous thixotropic dispersion of the polymer.

Example 6

The procedure of Example 2 was followed, but with a change in the proportion of the emulsifying agent used in the heated solution, 35% being so used. A viscous, thixotropic emulsion was likewise obtained, containing dispersed polymer.

Example 7

The procedure of Example 2 was followed in general, but with a change in the proportion of emulsifying agent used in the heated solution and in the temperature of polymerization. In this case 28% of the total emulsifying agent was used in the heated solution. The polymerization was carried out at 90° C. on a water bath. A highly viscous dispersion of polymeric ethyl acrylate was obtained.

The viscous, thixotropic emulsions of the lower esters of acrylic and methacrylic acids and copolymers of mixtures of such esters are useful for the coating of fibrous materials, for finishing and sealing coats over other types of coating materials, and for other types of coating or calendering operations.

We claim:

1. The process of preparing thixotropic dispersions of polymeric esters from corresponding monomeric esters from the group consisting of methyl acrylate, ethyl acrylate, methyl methacrylate, ethyl methacrylate, which comprises emulsifying an ester of the above group in the monomeric form with a cation-active emulsifying agent in water, preparing an aqueous solution containing a cation-active emulsifying agent in an amount of at least 5% of the total emulsifying agent in both emulsion and aqueous solution, heating said solution to a temperature causing polymerization of said ester, and adding the emulsion of said monomeric ester to the heated solution in the presence of a polymerization catalyst at such a rate that polymerizing temperatures are maintained.

2. The process of preparing thixotropic dispersions of polymeric esters from corresponding monomeric esters from the group consisting of methyl acrylate, ethyl acrylate, methyl methacrylate, ethyl methacrylate, which comprises emulsifying an ester of the above group in the monomeric form with a cation-active emulsifying agent in water, adding thereto a peroxide polymerization catalyst, preparing an aqueous solution of a cation-active emulsifying agent in an amount of at least 5% of the total emulsifying agent in both emulsion and aqueous solution, heating said solution to a temperature of from about 90° C. to about 100° C., and adding the emulsion of said monomer to the heated solution while maintaining the temperature of the resulting mixture between about 90° C. and about 100° C.

3. The process of preparing a thixotropic dispersion of polymeric ethyl acrylate from its monomer which comprises emulsifying monomeric ethyl acrylate in water with a cation-active emulsifying agent, preparing an aqueous solution of a cation-active emulsifying agent in an amount of 5% to 35% of the total emulsifying agent in both emulsion and aqueous solution, heating said solution to a temperature causing polymerization of ethyl acrylate, and adding the emulsion to the heated solution in the presence of a polymerization catalyst at such a rate that polymerizing temperatures are maintained.

4. The process of preparing a thixotropic dispersion of polymeric methyl methacrylate from its monomer which comprises emulsifying monomeric methyl methacrylate in water with a cation-active emulsifying agent, preparing an aqueous solution of a cation-active emulsifying agent in an amount of 5% to 35% of the total emulsifying agent in both emulsion and aqueous solution, heating said solution to a temperature causing polymerization of methyl methacrylate, and adding the emulsion to the heated solution in the presence of a polymerization catalyst at such a rate that polymerizing temperatures are maintained.

5. The process of preparing thixotropic dispersions of polymeric esters from corresponding monomeric esters from the group consisting of methyl acrylate, ethyl acrylate, methyl methacrylate, ethyl methacrylate, which comprises emulsifying an ester of the above group in the monomeric form with cetyldimethylamine acetate in water, preparing an aqueous solution of cetyldimethylamine acetate in an amount of at least 5% of the total amine acetate in both emulsion and aqueous solution, heating said solution to a temperature causing polymerization of said ester, and adding the emulsion of said monomeric ester to the heated solution in the presence of a polymerization catalyst at such a rate that polymerization temperatures are maintained.

6. The process of preparing thixotropic dispersions of polymeric ethyl acrylate which comprises emulsifying monomeric ethyl acrylate with cetyldimethylamine acetate in water, preparing an aqueous solution of cetyldimethylamine acetate in an amount of at least 5% of the total amine acetate in both emulsion and aqueous solution, heating said solution to a temperature causing polymerization of said ethyl acrylate, and adding the emulsion of said ethyl acrylate to the heated solution in the presence of a polymerization catalyst at such a rate that polymerization temperatures are maintained.

7. The process of preparing thixotropic dispersions of polymeric methyl methacrylate which comprises emulsifying monomeric methyl methacrylate with cetyldimethylamine acetate in water, preparing an aqueous solution of cethyldimethylamine acetate in an amount of at least 5% of the total amine acetate in both emulsion and aqueous solution, heating said solution to a temperature causing polymerization of said methyl methacrylate, and adding the emulsion of said methyl methacrylate to the heated solution in the presence of a polymerization catalyst at such a rate that polymerization temperatures are maintained.

HARRY T. NEHER.
WILLIAM R. CONN.